(12) United States Patent
Huang

(10) Patent No.: US 7,988,778 B2
(45) Date of Patent: Aug. 2, 2011

(54) METHOD OF MAKING COMPOSITE COATING AND PRODUCT FORMED WITH THE COMPOSITE COATING

(75) Inventor: Chih-Hao Huang, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 360 days.

(21) Appl. No.: 12/335,913

(22) Filed: Dec. 16, 2008

(65) Prior Publication Data

US 2010/0147192 A1    Jun. 17, 2010

(51) Int. Cl.
*C23C 30/00* (2006.01)
*C09D 193/00* (2006.01)

(52) U.S. Cl. ........... 106/287.1; 106/287.13; 106/287.14; 106/287.15; 106/287.16; 106/287.17; 106/287.18; 106/287.19

(58) Field of Classification Search . 106/287.11–287.19
See application file for complete search history.

(56) References Cited

U.S. PATENT DOCUMENTS

| | | | | |
|---|---|---|---|---|
| 4,814,017 A | * | 3/1989 | Yoldas et al. | 106/287.12 |
| 4,997,482 A | * | 3/1991 | Haluska et al. | 106/287.16 |
| 5,271,768 A | * | 12/1993 | Morishima et al. | 106/287.16 |
| 5,316,855 A | * | 5/1994 | Wang et al. | 428/447 |
| 5,674,624 A | * | 10/1997 | Miyazaki et al. | 428/422 |
| 6,235,101 B1 | * | 5/2001 | Kurosawa et al. | 106/287.14 |
| 6,676,740 B2 | * | 1/2004 | Matsumura et al. | 106/287.1 |
| 7,393,469 B2 | * | 7/2008 | Benrashid et al. | 252/301.36 |
| 2004/0110012 A1 | * | 6/2004 | Bier et al. | 428/422.8 |

* cited by examiner

*Primary Examiner* — David M Brunsman
(74) *Attorney, Agent, or Firm* — WPAT, P.C.; Anthony King

(57) ABSTRACT

A method of making a composite coating includes the steps of: adding a proper quantity of inorganic metal salt into an organic dissolvent to form a first mixed solution and then stirring the first mixed solution for 30-60 minutes; adding a proper quantity of $SiO_2$ precursor into the first mixed solution to form a second mixed solution and then stirring the second mixed solution for 30-60 minutes; adding a proper quantity of catalyzer and water into the second mixed solution for being reacted with each other so as to form a coating solution via being stirred for 4-8 hours; and putting the coating solution under the room temperature for 24 hours so as to obtain the composite coating. A product formed with the foregoing composite coating includes a base body and a layer of composite protective film formed by the composite coating on surfaces of the base body.

10 Claims, No Drawings

METHOD OF MAKING COMPOSITE COATING AND PRODUCT FORMED WITH THE COMPOSITE COATING

BACKGROUND OF THE INVENTION

1. Field of the Invention

The present invention generally relates to a coating and uses thereof, and more particularly to a method of making a composite coating and a product formed with the composite coating.

2. The Related Art

At present, a sol-gel method is widely applied to manufacture $SiO_2$ coating, $TiO_2$ coating and $ZrO_2$ coating, etc. The $SiO_2$ coating, the $TiO_2$ coating and the $ZrO_2$ coating are generally used to be coated onto surfaces of a base body of a product so as to form $SiO_2$ films, $TiO_2$ films and $ZrO_2$ films respectively. The films can protect the product from being damaged. However, the $SiO_2$ coating, the $TiO_2$ coating and the $ZrO_2$ coating manufactured by the sol-gel method each have only one single function, and accordingly, the $SiO_2$ film, the $TiO_2$ film and the $ZrO_2$ film respectively formed by the $SiO_2$ coating, the $TiO_2$ coating and the $ZrO_2$ coating each have only one corresponding function so that the foregoing films can not fully protect the product. Therefore, a method of making a composite coating is required to manufacture the composite coating having many kinds of composite functions.

SUMMARY OF THE INVENTION

An object of the present invention is to provide a method of making a composite coating and a product formed with the composite coating. The method is described hereinafter. Firstly, a proper quantity of inorganic metal salt is added into an organic dissolvent to form a first mixed solution and then the first mixed solution is stirred for 30-60 minutes. Secondly, a proper quantity of $SiO_2$ precursor is added into the first mixed solution to form a second mixed solution and then the second mixed solution is stirred for 30-60 minutes. Next, a proper quantity of catalyzer and water is added into the second mixed solution for being reacted with each other so as to form a coating solution via being stirred for 4-8 hours. Lastly, the coating solution is subjected to the room temperature for 24 hours so as to obtain the composite coating. The product formed with the foregoing composite coating includes a base body and a layer of composite protective film formed on surfaces of the base body, wherein the composite protective film is formed by coating the composite coating onto the surfaces of the base body firstly and then putting the base body under the room temperature or a heating environment of lower than 100 degrees centigrade for a period of time to make the composite coating dried.

As described above, the above-mentioned method according to the present invention can manufacture the composite coating having many kinds of composite functions, and accordingly, the composite protective film of the product formed by the composite coating has many kinds of composite functions so as to further protect the product fully.

DETAILED DESCRIPTION OF THE PREFERRED EMBODIMENT

A method of making a composite coating according to the present invention is described hereinafter.

Firstly, a proper quantity of inorganic metal salt is added into an organic dissolvent to form a first mixed solution and then the first mixed solution is stirred for 30-60 minutes, wherein the organic dissolvent is any one of or a mixture of an ethanol dissolvent and an isopropanol dissolvent. The inorganic metal salt is any one of or a mixture of at least two selected from a $TiO_2$ precursor, a $Al_2O_3$ precursor, a $ZrO_2$ precursor and a ZnO precursor, wherein the $TiO_2$ precursor is any one of or a mixture of $Ti(OC_2H_5)_4$ and $Ti(OCH(CH_3)_2)_4$, the $Al_2O_3$ precursor is any one of or a mixture of $Al(OC_3H_7)_3$ and $Al[OCH(CH_3)C_2H_5]_3$, the $ZrO_2$ precursor is any one of or a mixture of at least two selected from $Zr(OC_2H_5)_4$, $Zr(OCH_2CH_2CH_3)_4$ and $Zr[OC(CH_3)_3]_4$, and the ZnO precursor is $Zn(CH_3COO)_2.2H_2O$.

Secondly, a proper quantity of $SiO_2$ precursor is added into the first mixed solution to form a second mixed solution and then the second mixed solution is stirred for 30-60 minutes, wherein the $SiO_2$ precursor is any one of or a mixture of at least two selected from $Si(OC_2H_5)_4$, $C_2H_5Si(OC_2H_5)_3$, $C_2H_5Si(OCH_3)_3$, $CH_3Si(OC_2H_5)_3$, $CH_3Si(OCH_3)_3$, $H_2C=CHSi(OC_2H_5)_3$ and $H_2C=CHSi(OCH_3)_3$.

Next, a proper quantity of catalyzer and water is added into the second mixed solution for being reacted with each other so as to form a coating solution via being stirred for 4-8 hours, wherein the water is deionized water and the catalyzer is 10%-40% consistency of acidic catalyzer or alkaline catalyzer. The acidic catalyzer is any one of or a mixture of at least two selected from HCl, $CH_3COOH$ and $HNO_3$, and the alkaline catalyzer is $NH_4OH$.

Lastly, the coating solution is subjected to the room temperature for 24 hours so as to obtain the composite coating having a steady chemical property, wherein the composite coating is any one of $SiO_2/TiO_2$, $SiO_2/ZrO_2$, $SiO_2/Al_2O_3$, $SiO_2/ZnO$, $SiO_2/TiO_2/Al_2O_3$, $SiO_2/TiO_2/ZnO$, $SiO_2/TiO_2/ZrO_2$, $SiO_2/Al_2O_3/ZnO$, $SiO_2/Al_2O_3/ZrO_2$, $SiO_2/ZrO_2/ZnO$, $SiO_2/TiO_2/Al_2O_3/ZrO_2$, $SiO_2/TiO_2/Al_2O_3/ZnO$, $SiO_2/TiO_2/ZrO_2/ZnO$ and $SiO_2/TiO_2/Al_2O_3/ZrO_2/ZnO$, and has many kinds of composite functions because $TiO_2$ is a kind of photocatalyst material, ZnO has an antiseptic function, and $SiO_2$, $ZrO_2$ and $Al_2O_3$ each have a resisting scrape and wear function.

A product formed with the foregoing composite coating includes a base body and composite protective films formed on surfaces of the base body, wherein the product having the composite protective films thereon is formed by coating the composite coating onto the surfaces of the base body firstly and then putting the base body under the room temperature or a heating environment of lower than 100 degrees centigrade for a period of time to make the composite coating dried for forming the composite protective films on the surfaces of the base body. Furthermore, the composite protective film formed by the composite coating of the present invention has many kinds of composite functions for further protecting the product fully.

Two embodiments, namely a method of making $SiO_2/Al_2O_3$ composite coating and a method of making $SiO_2/TiO_2/Al_2O_3$ composite coating, are introduced for describing the above-mentioned method in detail.

The method of making the $SiO_2/Al_2O_3$ composite coating is described hereinafter. Firstly, 2 ml $Al(OC_3H_7)_3$ is added into 300 ml ethanol dissolvent to form a first mixed solution and then the first mixed solution is stirred for 30 minutes under the room temperature. Secondly, 50 ml $Si(OC_2H_5)_4$, 50 ml $C_2H_5Si(OC_2H_5)_3$ and 50 ml $H_2C=CHSi(OCH_3)_3$ are added into the first mixed solution to form a second mixed solution and then the second mixed solution is stirred for 30 minutes under the room temperature. Next, 10 ml 10% consistency of HCl and 15 ml deionized water are added into the second mixed solution for being reacted with each other so as to form a coating solution via being stirred for 4 hours. Lastly, the coating solution is subjected to the room temperature for 24 hours so as to obtain the $SiO_2/Al_2O_3$ composite coating having a steady chemical property and a resisting scrape and wear function. When a product is formed with the $SiO_2/Al_2O_3$ composite coating, the $SiO_2/Al_2O_3$ composite coating is firstly coated onto surfaces of a base body of the product, and then the base body is subjected to the room temperature for 30 minutes to make the $SiO_2/Al_2O_3$ composite coating dried naturally so as to form $SiO_2/Al_2O_3$ composite protective films on the surfaces of the base body, wherein the $SiO_2/Al_2O_3$ composite protective film of the product has a resisting scrape and wear function.

The method of making the $SiO_2/TiO_2/Al_2O_3$ composite coating is described hereinafter. Firstly, 1.5 ml $Al[OCH(CH_3)C_2H_5]_3$ and 1.5 ml $Ti(OCH(CH_3)_2)_4$ are added into 300 ml ethanol dissolvent to form a first mixed solution and then the first mixed solution is stirred for 30 minutes under the room temperature. Secondly, 50 ml $Si(OC_2H_5)_4$, 50 ml $H_2C=CHSi(OC_2H_5)_3$ and 50 ml $H_2C=CHSi(OCH_3)_3$ are added into the first mixed solution to form a second mixed solution and then the second mixed solution is stirred for 30 minutes under the room temperature. Next, 10 ml 10% consistency of HCl and 15 ml deionized water are added into the second mixed solution for being reacted with each other so as to form a coating solution via being stirred for 4 hours. Lastly, the coating solution is subjected to the room temperature for 24 hours so as to obtain the $SiO_2/TiO_2/Al_2O_3$ composite coating having a steady chemical property, a resisting scrape and wear function and further capable of be used as a kind of photocatalyst material. When a product is formed with the $SiO_2/TiO_2/Al_2O_3$ composite coating, the $SiO_2/TiO_2/Al_2O_3$ composite coating is firstly coated onto surfaces of a base body of the product, and then the base body is subjected to a heating environment of 50 degrees centigrade for 3 minutes to make the $SiO_2/TiO_2/Al_2O_3$ composite coating dried so as to form $SiO_2/TiO_2/Al_2O_3$ composite protective films on the surfaces of the base body, wherein the $SiO_2/TiO_2/Al_2O_3$ composite protective film of the product has a resisting scrape and wear function and further can play a part of photocatalyst material.

As described above, the above-mentioned method according to the present invention can manufacture the composite coating having many kinds of composite functions, and accordingly, the composite protective film of the product formed by the composite coating has many kinds of composite functions so as to further protect the product fully.

What is claimed is:

1. A method of making a composite coating, comprising the steps of:
    adding a quantity of inorganic metal salt into an organic dissolvent to form a first mixed solution and then stirring the first mixed solution for 30-60 minutes;
    adding a quantity of $SiO_2$ precursor into the first mixed solution to form a second mixed solution and then stirring the second mixed solution for 30-60 minutes;
    adding a quantity of catalyzer and water into the second mixed solution for being reacted with each other so as to form a coating solution via being stirred for 4-8 hours; and
    putting the coating solution under the room temperature for 24 hours so as to obtain the composite coating.

2. The method as claimed in claim 1, wherein the inorganic metal salt is any one of or a mixture of at least two selected from a $TiO_2$ precursor, a $Al_2O_3$ precursor, a $ZrO_2$ precursor and a ZnO precursor.

3. The method as claimed in claim 2, wherein the $TiO_2$ precursor is any one of or a mixture of $Ti(OC_2H_5)_4$ and $Ti(OCH(CH_3)_2)_4$, the $Al_2O_3$ precursor is any one of or a mixture of $Al(OC_3H_7)_3$ and $Al[OCH(CH_3)C_2H_5]_3$, the $ZrO_2$ precursor is any one of or a mixture of at least two selected from $Zr(OC_2H_5)_4$, $Zr(OCH_2CH_2CH_3)_4$ and $Zr[OC(CH_3)_3]_4$, and the ZnO precursor is $Zn(CH_3COO)_2 \cdot 2H_2O$.

4. The method as claimed in claim 1, wherein the organic dissolvent is any one of or a mixture of an ethanol dissolvent and an isopropanol dissolvent.

5. The method as claimed in claim 1, wherein the $SiO_2$ precursor is any one of or a mixture of at least two selected from $Si(OC_2H_5)_4$, $C_2H_5Si(OC_2H_5)_3$, $C_2H_5Si(OCH_3)_3$, $CH_3Si(OC_2H_5)_3$, $CH_3Si(OCH_3)_3$, $H_2C=CHSi(OC_2H_5)_3$ and $H_2C=CHSi(OCH_3)_3$.

6. The method as claimed in claim 1, wherein the water is deionized water.

7. The method as claimed in claim 1, wherein the catalyzer is 10%-40% consistency of acidic catalyzer.

8. The method as claimed in claim 7, wherein the acidic catalyzer is any one of or a mixture of at least two selected from HCl, $CH_3COOH$ and $HNO_3$.

9. The method as claimed in claim 1, wherein the catalyzer is 10%-40% consistency of alkaline catalyzer.

10. The method as claimed in claim 9, wherein the alkaline catalyzer is $NH_4OH$.

* * * * *